US008011443B2

(12) United States Patent
Meixner et al.

(10) Patent No.: US 8,011,443 B2

(45) Date of Patent: Sep. 6, 2011

(54) STRIKING MECHANISM FOR A HANDHELD POWER TOOL

(75) Inventors: Gerhard Meixner, Filderstadt (DE); Otto Baumann, Leinfelden-Echterdingen (DE); Jan Koalick, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 12/519,090

(22) PCT Filed: Oct. 24, 2007

(86) PCT No.: PCT/EP2007/061414

§ 371 (c)(1), (2), (4) Date: Jun. 12, 2009

(87) PCT Pub. No.: WO2008/074549

PCT Pub. Date: Jun. 26, 2008

(65) Prior Publication Data

US 2010/0025061 A1 Feb. 4, 2010

(30) Foreign Application Priority Data

Dec. 20, 2006 (DE) ........................ 10 2006 060 320

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***E21B 1/00*** | (2006.01) |

(52) U.S. Cl. ......... 173/118; 173/201; 173/202; 173/211

(58) Field of Classification Search ............ 173/90–118, 173/200–201, 204, 211

See application file for complete search history.

(56) References Cited

U.S. PATENT DOCUMENTS

| | | | | |
|---|---|---|---|---|
| 3,749,185 | A * | 7/1973 | Tiraspolsky et al. | 175/26 |
| 3,837,409 | A | 9/1974 | Cosoli et al. | |
| 3,891,036 | A * | 6/1975 | Schmidt | 173/91 |
| 4,290,489 | A * | 9/1981 | Leavell | 173/17 |
| 4,418,769 | A * | 12/1983 | Vincent et al. | 173/206 |
| 4,567,951 | A * | 2/1986 | Fehrle et al. | 173/201 |
| 4,862,972 | A * | 9/1989 | Sudinshnikov et al. | 173/121 |
| 4,938,297 | A * | 7/1990 | Schmidt | 175/19 |
| 5,992,541 | A * | 11/1999 | Frenzel et al. | 173/201 |
| 6,116,352 | A | 9/2000 | Frauhammer et al. | |
| 6,152,245 | A * | 11/2000 | Nilsson | 173/218 |
| 6,568,484 | B1 * | 5/2003 | Schmid et al. | 173/201 |
| 6,986,250 | B2 * | 1/2006 | Dasilva | 60/584 |
| 2003/0221847 | A1 * | 12/2003 | Funfer | 173/201 |
| 2004/0033852 | A1 * | 2/2004 | Taomo et al. | 474/101 |
| 2004/0177981 | A1 | 9/2004 | Berger | |
| 2007/0017684 | A1 * | 1/2007 | Stirm et al. | 173/109 |
| 2008/0217040 | A1 * | 9/2008 | Loeffler et al. | 173/201 |

FOREIGN PATENT DOCUMENTS

| | | |
|---|---|---|
| DE | 720150 | 4/1942 |
| DE | 2409206 | 9/1974 |

(Continued)

*Primary Examiner* — Rinaldi I Rada

*Assistant Examiner* — Robert F Long

(74) *Attorney, Agent, or Firm* — Ronald E. Greigg

(57) ABSTRACT

The invention is a striking mechanism for a handheld power tools in particular electric hammer. A piston is arranged in an axially bidirectionally movable manner in a guide tube. A striker is provided which acts on a striking pin and which is held in a movable manner in the guide tube. A compression space is delimited by the piston and the striker such that an air cushion is enclosed therein. It is proposed that at least one spring element is provided between the striker and the striking pin.

20 Claims, 2 Drawing Sheets

FOREIGN PATENT DOCUMENTS

| | | | |
|---|---|---|---|
| DE | 19810088 | C1 | 8/1999 |
| EP | 1340596 | A1 | 9/2003 |
| GB | 191406196 | | 6/1915 |
| GB | 474056 | | 10/1937 |
| JP | 61095807 | A | 5/1986 |
| WO | 03024672 | A1 | 3/2003 |

* cited by examiner

STRIKING MECHANISM FOR A HANDHELD POWER TOOL

CROSS-REFERENCE TO RELATED APPLICATION

This application is a 35 USC 371 application of PCT/EP 2007/061414 filed on Oct. 24, 2007.

BACKGROUND OF THE INVENTION

1. Field of the Invention

The invention is based on an impact mechanism for a handheld power tool.

2. Description of the Prior Art

DE 198 10 088 C1 has disclosed an impact mechanism for a handheld power tool of the type defining this species. The impact mechanism has a guide tube in which a piston and a striking element are accommodated in reciprocating fashion. The striking element acts on a striking pin. Between the piston and the striking element, the guide tube contains a compression chamber in which an air cushion is enclosed. The piston and striking element are coupled in an axially reciprocating fashion by means of the air cushion.

ADVANTAGES AND SUMMARY OF THE INVENTION

The invention is based on an impact mechanism for a handheld power tool, in particular an electric hammer, having a piston that is arranged in an axially and bidirectionally movable fashion in a guide tube, having a striking element that is contained in a sliding fashion in the guide tube and acts on a striking pin, and having a compression chamber, which is delimited by the piston and the striking element and encloses an air cushion.

According to one proposal, a spring element is provided between the striking element and the striking pin. An embodiment of this kind permits a powerful transmission of force from the striking element to the striking pin. The presence of the spring element produces an oscillatory system comprising the piston, the striking element, and the striking pin, which assists the stopping of the striking element against the striking pin. in particular, the stopping behavior of the striking element is improved under cold conditions, as a result of which the handheld power tool functions reliably at any temperature.

According a proposal in another embodiment, the spring element is a mechanical, hydraulic, and/or pneumatic spring. The free selection of the various spring types permits a precise tuning of the oscillatory system. The selection of the spring type can also be used to select or adjust both the spring force and the spring path.

According to another proposal, the spring element is a compression spring, which permits the impact mechanism to be manufactured in a structurally simple, particularly inexpensive fashion. A compression spring can be provided in the guide tube of the impact mechanism.

According to another proposal, the spring element is fastened to the striking element or to the striking pin. This enables a stressing of the spring element and a recoiling of the striking element or of the striking pin by means of the stressed spring element.

According to another proposal, the spring element is a spiral spring. This enables a particularly inexpensive design since it is possible to use a simple standard part.

According to a proposal in another embodiment, the spiral spring is situated on a shaft of the striking pin. This permits a simple installation of the spring, which is also simultaneously centered as it is being installed. The shaft advantageously constitutes a guide for the spring. The shaft therefore prevents the spring from buckling and as a result, becoming jammed in the guide tube.

According to another proposal, the shaft has an indentation for the form-locked accommodation of a coil situated at a first end of the spiral spring. This embodiment permits a simple fastening of the spring to the striking pin without an additional component or fastening means, which in turn reduces the cost.

According to another proposal, the striking element has an end surface that is provided for temporary support of the spring element. This simple geometry permits a precisely aimed introduction of force.

According to another proposal, an axial stop is provided for the striking element and the striking pin. It is also possible to advantageously influence the spring force through the position of the stop in the guide tube.

BRIEF DESCRIPTION OF THE DRAWINGS

Other advantages ensue from the following description taken in conjunction with the drawings, in which.

DESCRIPTION OF THE PREFERRED EMBODIMENTS

Figure 1:
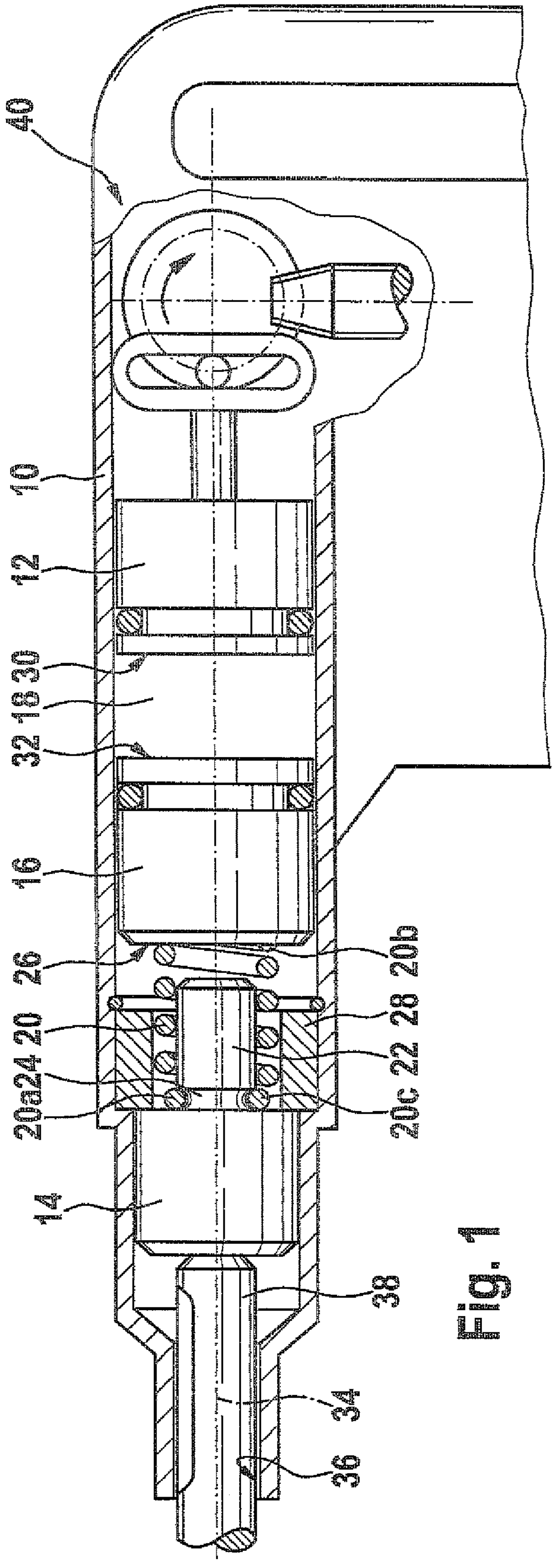
FIG. 1 is a schematic diagram of a handheld power tool, with a partial section through an impact mechanism according to the invention, in a starting position.

FIG. 1 is a schematic diagram of a handheld power tool, in particular an electric hammer, equipped with an impact mechanism. The impact mechanism has a piston 12 and the striking element 16 that are accommodated in axial sequence in a guide tube 10 and are guided in an axially and bidirectionally movable fashion therein. The striking element 16 acts on a striking pin 14 that is likewise guided in an axially movable fashion in the guide tube 10. A first end surface 30 of the piston 12 and a first end surface 32 of the striking element 16, which are oriented toward each other, delimit a compression chamber 18 in which an air cushion is enclosed. An axis 34 of the guide tube 10 coincides with the axis of a tool holder 36 in which a tool 38 can be accommodated.

Figure 2:
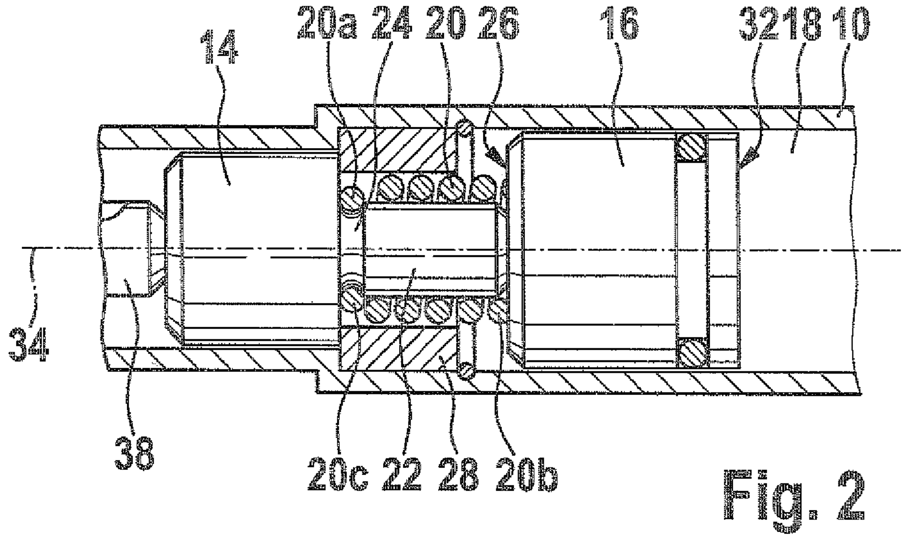
FIG. 2 shows the partially depicted impact mechanism in an intermediate position.

From a starting position shown in FIG. 1, a drive unit 40 sets the piston 12 into a reciprocating axial stroke motion in the guide tube 10, causing the air cushion in the compression chamber 18 according to FIG. 2 to be compressed and then pressure-relieved in alternating fashion. According to FIG. 3, the striking element 16 is accelerated by the compression pressure and imparts its energy to the tool 38 via the striking pin 14.

In order in particular to improve the starting behavior of the handheld power tool, according to the invention, at least one spring element 20 is situated between the striking element 16 and the striking pin 14. The at least one spring element 20 can be a mechanical, hydraulic, or pneumatic spring. Preferably, the spring on 20 is embodied in the form of a compression spring.

In the present exemplary embodiment, the spring element 20 is fastened to the striking pin 14. Alternatively, the spring element 20 can be fastened to the striking element 16.

In the present exemplary embodiment, the spring element 20 is a spiral spring that is attached to the striking pin 14 at a first end 20*a*.

The striking pin 14 has a stepped shaft 22. The spring element 20 is situated on the shaft 22 of the striking pin 14. The shaft 22 has an indentation 24 for the form-locked accommodation of a coil 20*c* situated at the first end 20*a* of the spring element 20. For example, this coil 20*c* is smaller in diameter than the remaining coils and as a result, clamps into the indentation 24 of the shaft 22. Preferably, the indentation 24 is provided at a transition between the striking pin 14 and the shaft 22 of the striking pin 14. Naturally, it is also conceivable for the spring element 20 to be fastened to the striking pin 14 in any other way deemed suitable by those skilled in the art.

The striking element 16 has a second end surface 26, which is provided for temporarily supporting a second end 20*b* of the spring element 20.

The impact mechanism has an axial stop 28 for the striking element 16 and the striking pin 14.

Figure 3:
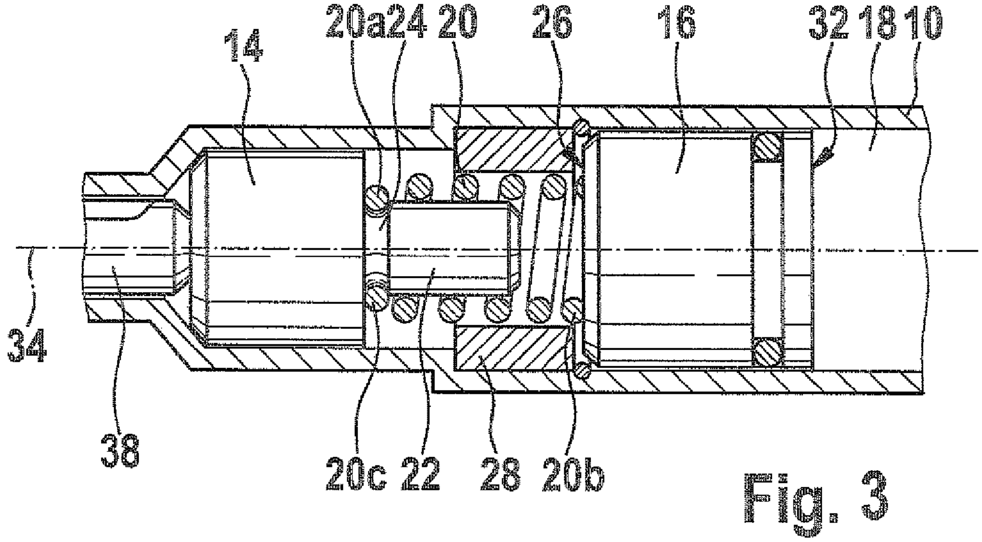
FIG. 3 shows the partially depicted impact mechanism in an idle position.

In the starting position of the impact mechanism and the piston 12 according to FIG. 1, the striking pin 14 is resting against the stop 28. The spring element 20 is in the relaxed state and rests with its second end 20*b* against the striking element 16. If the piston 12 and the air cushion set the striking element 16 into motion, it first moves in reciprocating fashion between the spring element 20 and the air cushion. This produces an oscillatory system. The impact that then occurs as shown in FIG. 2 first stresses the spring element 20 with a small part of its kinetic energy before the majority of this energy is imparted to the striking pin 14. After the end of the impact, the stressed spring element 20 causes the striking element 16 to recoil for the next impact. In FIG. 3, the striking pin 14 is in a forward position. The striking element 16 is likewise in a forward position and rests against the stop 28. The second end 20*b* of the spring element 20 is not in contact with the striking element 16. The spring element 20 has no effect and is therefore in an idle state.

The foregoing relates to the preferred exemplary embodiments of the invention, it being understood that other variants and embodiments thereof are possible within the spirit and scope of the invention, the latter being defined by the appended claims.

The invention claimed is:

1. An impact mechanism for a handheld power tool, in particular an electric hammer, comprising:

a piston that is arranged in an axially and bidirectionally movable fashion in a guide tube;

a striking pin contained in the guide tube;

a striking element contained in sliding fashion in the guide tube and which acts on the striking pin;

a compression chamber, which is formed in the guide tube between the piston and the striking element;

an air cushion enclosed by the compression chamber; and at least one spring element is provided between the striking element and the striking pin.

2. The impact mechanism as recited in claim 1, wherein the spring element is a mechanical, hydraulic, and/or pneumatic spring.

3. The impact mechanism as recited in claim 2, wherein the spring element is a compression spring.

4. The impact mechanism as recited in claim 2, wherein the spring element is fastened to the striking element.

5. The impact mechanism as recited in claim 1, wherein the spring element is a compression spring.

6. The impact mechanism as recited in claim 2, wherein the spring element is fastened to the striking pin.

7. The impact mechanism as recited in claim 5, wherein the spring element is fastened to the striking pin.

8. The impact mechanism as recited in claim 1, wherein the spring element is a spiral spring.

9. The impact mechanism as recited in claim 2, wherein the spring element is a spiral spring.

10. The impact mechanism as recited in claim 8, wherein the spiral spring is situated on a shaft of the striking pin.

11. The impact mechanism as recited in claim 9, wherein the spiral spring is situated on a shaft of the striking pin.

12. The impact mechanism as recited in claim 10, wherein the shaft has an indentation for a form-locked accommodation of a coil situated at a first end of the spiral spring.

13. The impact mechanism as recited in claim 11, wherein the shaft has an indentation for a form-locked accommodation of a coil situated at a first end of the spiral spring.

14. The impact mechanism as recited in claim 5, wherein the spring element is fastened to the striking element.

15. The impact mechanism as recited in claim 1, wherein the spring element is fastened to the striking element.

16. The impact mechanism as recited in claim 1, wherein the spring element is fastened to the striking pin.

17. The impact mechanism as recited in claim 16, wherein the striking element has an end surface that is provided for temporarily supporting the spring element.

18. The impact mechanism as recited in claim 1, wherein the striking element has an end surface that is provided for temporarily supporting the spring element.

19. The impact mechanism as recited in claim 1, further comprising an axial stop for the striking element and the striking pin.

20. A handheld power tool having an impact mechanism as recited in claim 1.

* * * * *